United States Patent
Ardiff et al.

(10) Patent No.: US 8,017,530 B1
(45) Date of Patent: *Sep. 13, 2011

(54) ENVIRONMENTALLY RESISTANT BALLISTIC COMPOSITE BASED ON A FLUOROCARBON-MODIFIED MATRIX BINDER

(75) Inventors: Henry G. Ardiff, Chesterfield, VA (US); Ralf Klein, Midlothian, VA (US); David A. Hurst, Richmond, VA (US); Ashok Bhatnagar, Richmond, VA (US); Brian D. Arvidson, Chester, VA (US); Lori L. Wagner, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 1203 days.

This patent is subject to a terminal disclaimer.

(21) Appl. No.: 11/729,256

(22) Filed: Mar. 28, 2007

(51) Int. Cl.
*B32B 27/04* (2006.01)
(52) U.S. Cl. .............. 442/134; 2/2.5; 428/911
(58) Field of Classification Search ............ 442/134, 442/135, 65, 66; 2/2.5; 428/911
See application file for complete search history.

(56) References Cited

U.S. PATENT DOCUMENTS

| | | | | |
|---|---|---|---|---|
| 4,613,535 | A * | 9/1986 | Harpell et al. | 428/113 |
| 4,680,221 | A | 7/1987 | Murayama et al. | 442/126 |
| 4,916,000 | A * | 4/1990 | Li et al. | 428/105 |
| 5,229,199 | A | 7/1993 | Minor et al. | |
| 5,354,605 | A * | 10/1994 | Lin et al. | 428/105 |
| 5,471,906 | A * | 12/1995 | Bachner et al. | 2/2.5 |
| 5,587,230 | A * | 12/1996 | Lin et al. | 442/135 |
| 6,034,004 | A | 3/2000 | Fels et al. | |
| 6,326,094 | B1 | 12/2001 | Asano et al. | 428/38 |
| 6,335,094 | B1 | 1/2002 | Owaki et al. | 428/374 |
| 6,838,401 | B1 | 1/2005 | Murayama et al. | 442/335 |
| 2007/0117483 | A1 * | 5/2007 | Bhatnagar et al. | 442/123 |

FOREIGN PATENT DOCUMENTS

| | | |
|---|---|---|
| EP | 0620410 | 10/1994 |
| EP | 1396572 | 3/2004 |
| EP | 1396698 | 3/2004 |

OTHER PUBLICATIONS

"Talking Tech—Textile Effects", Ciba Specialty Chemicals, 2005, XP002489113.

* cited by examiner

*Primary Examiner* — Arti Singh-Pandey

(57) ABSTRACT

Ballistic resistant fabrics and articles that retain their superior ballistic resistance performance after exposure to liquids such as sea water and organic solvents, such as gasoline and other petroleum-based products. The fabrics incorporate a fluorine-containing polymeric binder composition and an optional surfactant.

33 Claims, No Drawings

ENVIRONMENTALLY RESISTANT BALLISTIC COMPOSITE BASED ON A FLUOROCARBON-MODIFIED MATRIX BINDER

BACKGROUND OF THE INVENTION

1. Field of the Invention

This invention relates to ballistic resistant articles having excellent resistance to deterioration due to liquid exposure. More particularly, the invention pertains to ballistic resistant fabrics and articles that retain their superior ballistic resistance performance after exposure to liquids such as sea water and organic solvents, such as gasoline and other petroleum-based products.

2. Description of the Related Art

Ballistic resistant articles containing high strength fibers that have excellent properties against projectiles are well known. Articles such as bullet resistant vests, helmets, vehicle panels and structural members of military equipment are typically made from fabrics comprising high strength fibers. High strength fibers conventionally used include polyethylene fibers, aramid fibers such as poly(phenylenediamine terephthalamide), graphite fibers, nylon fibers, glass fibers and the like. For many applications, such as vests or parts of vests, the fibers may be used in a woven or knitted fabric. For other applications, the fibers may be encapsulated or embedded in a polymeric matrix material to form woven or non-woven rigid or flexible fabrics.

Various ballistic resistant constructions are known that are useful for the formation of hard or soft armor articles such as helmets, panels and vests. For example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, describe ballistic resistant composites which include high strength fibers made from materials such as extended chain ultra-high molecular weight polyethylene. These composites display varying degrees of resistance to penetration by high speed impact from projectiles such as bullets, shells, shrapnel and the like.

For example, U.S. Pat. Nos. 4,623,574 and 4,748,064 disclose simple composite structures comprising high strength fibers embedded in an elastomeric matrix. U.S. Pat. No. 4,650,710 discloses a flexible article of manufacture comprising a plurality of flexible layers comprised of high strength, extended chain polyolefin (ECP) fibers. The fibers of the network are coated with a low modulus elastomeric material. U.S. Pat. Nos. 5,552,208 and 5,587,230 disclose an article and method for making an article comprising at least one network of high strength fibers and a matrix composition that includes a vinyl ester and diallyl phthalate. U.S. Pat. No. 6,642,159 discloses an impact resistant rigid composite having a plurality of fibrous layers which comprise a network of filaments disposed in a matrix, with elastomeric layers there between. The composite is bonded to a hard plate to increase protection against armor piercing projectiles.

Hard or rigid body armor provides good ballistic resistance, but can be very stiff and bulky. Accordingly, body armor garments, such as ballistic resistant vests, are preferably formed from flexible or soft armor materials. However, while such flexible or soft materials exhibit excellent ballistic resistance properties, they also generally exhibit poor resistance to liquids, including fresh water, seawater and organic solvents, such as petroleum, gasoline, gun lube and other solvents derived from petroleum. This is problematic because the ballistic resistance performance of such materials is generally known to deteriorate when exposed to or submerged in liquids. Further, while it has been known to apply a protective film to a fabric surface to enhance fabric durability and abrasion resistance, as well as water or chemical resistance, these films add weight to the fabric. Accordingly, it would be desirable in the art to provide soft, flexible ballistic resistant materials that perform at acceptable ballistic resistance standards after being contacted with or submerged in a variety of liquids, and also have superior durability without the use of a protective surface film in addition to a binder polymer coating.

Few conventional binder materials, commonly referred to in the art as polymeric "matrix" materials, are capable of providing all the desired properties discussed herein. Fluorine-containing polymers are desirable in other arts due to their resistance to dissolution, penetration and/or transpiration by sea water and resistance to dissolution, penetration and/or transpiration by one or more organic solvents, such as diesel gasoline, non-diesel gasoline, gun lube, petroleum and organic solvents derived from petroleum. In the art of ballistic resistant materials, it has been discovered that fluorine-containing coatings advantageously contribute to the retention of the ballistic resistance properties of a ballistic resistant fabric after prolonged exposure to potentially harmful liquids, eliminating the need for a protective surface film to achieve such benefits. More particularly, it has been found that excellent ballistic and environmental properties are achieved when coating ballistic resistant fibrous materials with a fluorine-containing polymeric binder composition that is a blend of a fluorine-containing polymer and a conventional polymeric matrix component as used in the art.

It has been unexpectedly found that the addition of a surfactant to a fluorine-containing blended polymeric binder composition achieves improved uniformity of the binder coating on the individual fibers. It has also been unexpectedly found that the addition of a surfactant promotes the uniform distribution of the fluorocarbon resin at the surfaces of the blended polymeric matrix binder. These surfaces or interfaces can be described as the air-to-blended polymeric matrix binder interface, or outside surface, and the fiber-to-blended polymeric matrix binder interface, or inside surface. This uniform distribution of the fluorocarbon resin at the surfaces increases the effectiveness of the fluorocarbon resin in regards to its enhancing the environmental resistance (salt water, gasoline, etc.) of the composite.

Accordingly, the present invention provides ballistic resistant fabrics which are formed with a polymeric binder material that offers the desired protection from liquids, as well as heat and cold resistance, and resistance to abrasion and wear, while maintaining good flexibility and superior ballistic resistance properties.

SUMMARY OF THE INVENTION

The invention provides a ballistic resistant fabric comprising a plurality of fibers arranged in an array, said fibers being united and forming a fabric, said fibers having a tenacity of about 7 g/denier or more and a tensile modulus of about 150 g/denier or more; and said fibers having a fluorine-containing polymeric binder composition thereon.

The invention also provides a ballistic resistant fabric comprising a plurality of overlapping, cross-plied fiber plies, said fibers having a tenacity of about 7 g/denier or more and a tensile modulus of about 150 g/denier or more; said fibers having a fluorine-containing polymeric binder composition thereon; the plurality of overlapping cross-plied fiber plies being consolidated with said polymeric binder composition to form said single-layer, consolidated fabric.

The invention further provides a method of producing a ballistic resistant fabric, the method comprising either step I) or step II), wherein:
I) applying a fluorine-containing polymeric binder composition onto a plurality of fibers and thereafter forming at least one fiber ply from said fibers; said fibers having a tenacity of about 7 g/denier or more and a tensile modulus of about 150 g/denier or more; or
II) forming at least one fiber ply and thereafter applying a fluorine-containing polymeric binder composition onto said at least one fiber ply; said fibers having a tenacity of about 7 g/denier or more and a tensile modulus of about 150 g/denier or more.

DETAILED DESCRIPTION OF THE INVENTION

The invention presents articles that retain superior ballistic penetration resistance after exposure to water, particularly sea water, and organic solvents, particularly solvents derived from petroleum such as gasoline. Particularly, the invention provides ballistic resistant fabrics and articles formed from high strength fibers that are coated with a fluorine-containing polymeric binder composition which is resistant to dissolution, penetration and/or transpiration by sea water and resistant to dissolution, penetration and/or transpiration by one or more organic solvents, such as diesel gasoline, non-diesel gasoline, gun lube, petroleum and organic solvents derived from petroleum. As used herein, a "fluorine-containing" polymeric binder composition describes a polymeric binder composition including at least one "fluorine-containing" component and at least one non-fluorine containing component. As used here, "fluorine-containing" components include fluoropolymers and/or fluorocarbon-containing materials (i.e. fluorocarbon resins). A "fluorocarbon resin" generally refers to polymers including fluorocarbon groups.

For the purposes of the invention, articles that have superior ballistic penetration resistance describe those which exhibit excellent properties against deformable projectiles. The articles also exhibit excellent resistance properties against fragment penetration, such as shrapnel. For the purposes of the present invention, a "fiber" is an elongate body the length dimension of which is much greater than the transverse dimensions of width and thickness. The cross-sections of fibers for use in this invention may vary widely. They may be circular, flat or oblong in cross-section. Accordingly, the term fiber includes filaments, ribbons, strips and the like having regular or irregular cross-section. They may also be of irregular or regular multi-lobal cross-section having one or more regular or irregular lobes projecting from the linear or longitudinal axis of the fibers. It is preferred that the fibers are single lobed and have a substantially circular cross-section.

In the preferred embodiment of the invention, the ballistic resistant fabrics of the invention are non-woven fabrics which comprise a plurality of overlapping, non-woven fibrous plies that are consolidated into a single-layer, monolithic element. In this embodiment, each ply comprises an arrangement of non-overlapping fibers that are aligned in a unidirectional, substantially parallel array. This type of fiber arrangement is known in the art as a "unitape" (unidirectional tape) and is referred to herein as a "single ply". As used herein, an "array" describes an orderly arrangement of fibers or yarns, and a "parallel array" describes an orderly parallel arrangement of fibers or yarns. A fiber "layer" describes a planar arrangement of woven or non-woven fibers or yarns including one or more plies. As used herein, a "single-layer" structure refers to monolithic structure composed of one or more individual fiber plies that have been consolidated into a single unitary structure. By "consolidating" it is meant that the polymeric binder composition together with each fiber ply are combined into a single unitary layer. Consolidation can occur via drying, cooling, heating, pressure or a combination thereof. The term "composite" refers to consolidated combinations of fibers with the polymeric binder composition.

A preferred non-woven fabric of the invention includes a plurality of stacked, overlapping plies (plurality of unitapes) wherein the parallel fibers of each single ply (unitape) are positioned orthogonally (0°/90°) to the parallel fibers of each adjacent single ply relative to the longitudinal fiber direction of each single ply. The stack of overlapping non-woven fiber plies is consolidated under heat and pressure, or by adhering the polymeric resin composition coatings of individual fiber plies, to form a single-layer, monolithic element which has also been referred to in the art as a single-layer, consolidated network where a "consolidated network" describes a consolidated (merged) combination of fiber plies with a polymeric binder composition. A polymeric binder composition as used herein is also referred to in the art as a polymeric matrix composition. The terms "polymeric binder composition" and "polymeric matrix composition" are used interchangeably herein, and describe a material that binds the fibers together by way of their adhesive characteristics or after being subjected to well known heat and/or pressure conditions.

As is conventionally known in the art, excellent ballistic resistance is achieved when individual fiber plies are cross-plied such that the fiber alignment direction of one ply is rotated at an angle with respect to the fiber alignment direction of another ply. Most preferably, the fiber plies are cross-plied orthogonally at 0° and 90° angles, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,573; and 4,737,402.

Most typically, non-woven fabrics include from 1 to about 6 plies, but may include as many as about 10 to about 20 plies as may be desired for various applications. The greater the number of plies translates into greater ballistic resistance, but also greater weight. Accordingly, the number of fiber plies forming a fabric or an article of the invention varies depending upon the ultimate use of the fabric or article. For example, in body armor vests for military applications, in order to form an article composite that achieves a desired 1.0 pound per square foot areal density (4.9 kg/m$^2$), a total of at 22 individual plies may be required, wherein the plies may be woven, knitted, felted or non-woven fabrics (with parallel oriented fibers or other arrangements) formed from the high-strength fibers described herein. In another embodiment, body armor vests for law enforcement use may have a number of plies based on the National Institute of Justice (NIJ) Threat Level. For example, for an NIJ Threat Level IIIA vest, there may also be a total of 22 plies. For a lower NIJ Threat Level, fewer plies may be employed.

Consolidated non-woven fabrics may be constructed using well known methods, such as by the methods described in U.S. Pat. No. 6,642,159, the disclosure of which is incorporated herein by reference. Further, the fiber plies of the invention may alternately comprise yarns rather than fibers, where a "yarn" is a strand consisting of multiple filaments. Non-woven fiber plies may alternately comprise felted structures which are formed using conventionally known techniques, comprising fibers in random orientation instead of parallel arrays. Articles of the invention may also comprise combinations of woven fabrics, non-woven fabrics formed from unidirectional fiber plies and non-woven felt fabrics.

In another embodiment of the invention, the ballistic resistant fabrics of the invention comprise woven fabrics. Woven fabrics may be formed using techniques that are well known in the art using any fabric weave, such as plain weave, crowfoot weave, basket weave, satin weave, twill weave and the like. Plain weave is most common, where fibers are woven together in an orthogonal 0°/90° orientation. In another embodiment, a hybrid structure may be assembled where one both woven and non-woven fabrics are combined and interconnected, such as by consolidation. Prior to weaving, the individual fibers of each woven fabric material may or may not be coated with the polymeric binder composition of the invention in a similar fashion as the non-woven fabrics.

The fibers forming the fabrics of the invention comprise high-strength, high tensile modulus fibers. As used herein, a "high-strength, high tensile modulus fiber" is one which has a preferred tenacity of at least about 7 g/denier or more, a preferred tensile modulus of at least about 150 g/denier or more, and preferably an energy-to-break of at least about 8 J/g or more, each both as measured by ASTM D2256. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

Particularly suitable high-strength, high tensile modulus fiber materials include polyolefin fibers, particularly extended chain polyolefin fibers, such as highly oriented, high molecular weight polyethylene fibers, particularly ultra-high molecular weight polyethylene fibers and ultra-high molecular weight polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzazole fibers, such as polybenzoxazole (PBO) and polybenzothiazole (PBT) fibers, liquid crystal copolyester fibers. Each of these fiber types is conventionally known in the art.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,551,296 and 5,006,390, which are also incorporated herein by reference. A particularly preferred fiber type for use in the invention are polyethylene fibers sold under the trademark SPECTRA® from Honeywell International Inc. SPECTRA® fibers are well known in the art and are described, for example, in U.S. Pat. Nos. 4,623,547 and 4,748,064.

Also particularly preferred are aramid (aromatic polyamide) or para-aramid fibers. Such are commercially available and are described, for example, in U.S. Pat. No. 3,671,542. For example, useful poly(p-phenylene terephthalamide) filaments are produced commercially by DuPont corporation under the trademark of KEVLAR®. Also useful in the practice of this invention are poly(m-phenylene isophthalamide) fibers produced commercially by DuPont under the trademark NOMEX®, fibers produced commercially by Teijin under the trademark TWARON®; aramid fibers produced commercially by Kolon Industries, Inc. of Korea under the trademark Heracron®; p-aramid fibers SVM™ and Rusar™ which are produced commercially by Kamensk Volokno JSC of Russia and Armos™ p-aramid fibers produced commercially by JSC Chim Volokno of Russia.

Suitable polybenzazole fibers for the practice of this invention are commercially available and are disclosed for example in U.S. Pat. Nos. 5,286,833, 5,296,185, 5,356,584, 5,534,205 and 6,040,050, each of which are incorporated herein by reference. Preferred polybenzazole fibers are ZYLON® brand fibers from Toyobo Co. Suitable liquid crystal copolyester fibers for the practice of this invention are commercially available and are disclosed, for example, in U.S. Pat. Nos. 3,975,487; 4,118,372 and 4,161,470, each of which is incorporated herein by reference.

Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and are widely commercially available.

The other suitable fiber types for use in the present invention include glass fibers, fibers formed from carbon, fibers formed from basalt or other minerals, rigid rod fibers such as M5® fibers, and combinations of all the above materials, all of which are commercially available. For example, the fibrous plies may be formed from a combination of SPECTRA® fibers and Kevlar® fibers. M5® fibers are rigid rod fibers comprising pyridobisimidazole-2,6-diyl (2,5-dihydroxy-p-phenylene) and are manufactured by Magellan Systems International of Richmond, Va. and are described, for example, in U.S. Pat. Nos. 5,674,969, 5,939,553, 5,945,537, and 6,040,478, each of which is incorporated herein by reference. Specifically preferred fibers include M5® fibers, polyethylene SPECTRA® fibers, aramid Kevlar® fibers and aramid TWARON® fibers. The fibers may be of any suitable denier, such as, for example, 50 to about 3000 denier, more preferably from about 200 to 3000 denier, most preferably from about 650 to about 1500 denier.

The most preferred fibers for the purposes of the invention are either high-strength, high tensile modulus extended chain polyethylene fibers or high-strength, high tensile modulus para-aramid fibers. As stated above, a high-strength, high tensile modulus fiber is one which has a preferred tenacity of about 7 g/denier or more, a preferred tensile modulus of about 150 g/denier or more and a preferred energy-to-break of about 8 J/g or more, each as measured by ASTM D2256. In the preferred embodiment of the invention, the tenacity of the fibers should be about 15 g/denier or more, preferably about 20 g/denier or more, more preferably about 25 g/denier or more and most preferably about 30 g/denier or more. The fibers of the invention also have a preferred tensile modulus of about 300 g/denier or more, more preferably about 400 g/denier or more, more preferably about 500 g/denier or more, more preferably about 1,000 g/denier or more and most preferably about 1,500 g/denier or more. The fibers of the invention also have a preferred energy-to-break of about 15 J/g or more, more preferably about 25 J/g or more, more preferably about 30 J/g or more and most preferably have an energy-to-break of about 40 J/g or more.

These combined high strength properties are obtainable by employing well known processes. U.S. Pat. Nos. 4,413,110, 4,440,711, 4,535,027, 4,457,985, 4,623,547 4,650,710 and 4,748,064 generally discuss the formation of preferred high strength, extended chain polyethylene fibers employed in the present invention. Such methods, including solution grown or gel fiber processes, are well known in the art. Methods of forming each of the other preferred fiber types, including para-aramid fibers, are also conventionally known in the art, and the fibers are commercially available.

In accordance with the invention, each of the fibers present in the woven or non-woven fabrics of the invention have one or more surfaces, and the surfaces of the fibers are at least partially coated with a polymeric binder composition that is resistant to dissolution by water, and resistant to dissolution by one or more organic solvents. Generally, a polymeric binder composition coating is necessary to efficiently merge, i.e. consolidate, a plurality of fiber plies. Most preferably, the outer surface of each fiber is substantially coated with said water and organic solvent resistant polymeric binder composition such that preferably 100% of the surface area of each individual fiber is covered by said polymeric binder composition. Where the fabrics comprise a plurality of yarns, each fiber forming a single strand of yarn is preferably coated with the polymeric binder composition.

It has been unexpectedly found that a polymeric binder composition comprising fluorine atoms, particularly a fluoropolymer and/or a fluorocarbon resin component combined with a conventional matrix binder polymer component, achieves the desired property of substantially retaining the ballistic performance of a ballistic resistant composite made with said polymer composition after the composite is immersed in either water, e.g. salt water, or gasoline. More specifically, it has been found that fabrics including fibers coated with a fluorine-containing polymeric binder composition have a significantly improved $V_{50}$ retention % after immersion in either salt water or gasoline, i.e. greater than 90% retention as illustrated in the inventive examples, compared to fabrics formed with only non-fluorine-containing polymeric binder compositions. It has also been found that fabrics comprising fibers coated with a fluorine-containing polymeric binder composition has a significantly reduced tendency to absorb either salt water or gasoline compared to fabrics formed with non-fluorine-containing polymeric binder compositions. Importantly, a fluorine-containing polymeric binder composition serves as a barrier between individual filaments, fibers and/or fabrics and salt water or gasoline.

Fluorine-containing materials, particularly fluoropolymers and fluorocarbon resin materials, are commonly known for their excellent chemical resistance and moisture barrier properties. Useful fluoropolymer and fluorocarbon resin materials herein include fluoropolymer homopolymers, fluoropolymer copolymers or blends thereof as are well known in the art and are described in, for example, U.S. Pat. Nos. 4,510,301, 4,544,721 and 5,139,878. Examples of useful fluoropolymers include, but are not limited to, homopolymers and copolymers of chlorotrifluoroethylene, ethylene-chlorotrifluoroethylene copolymer, ethylene-tetrafluoroethylene copolymer, fluorinated ethylene-propylene copolymer, perfluoroalkoxyethylene, polychlorotrifluoroethylene, polytetrafluoroethylene, polyvinyl fluoride, polyvinylidene fluoride, and copolymers and blends thereof.

As used herein, copolymers include polymers having two or more monomer components. Preferred fluoropolymers include homopolymers and copolymers of polychlorotrifluoroethylene. Particularly preferred are PCTFE (polychlorotrifluoroethylene homopolymer) materials sold under the ACLON™ trademark and which are commercially available from Honeywell International Inc. of Morristown, N.J. The most preferred fluoropolymers or fluorocarbon resins include fluorocarbon-modified polymers, particularly fluoro-oligomers and fluoropolymers formed by grafting fluorocarbon side-chains onto conventional polyethers (i.e. fluorocarbon-modified polyethers), polyesters (i.e. fluorocarbon-modified polyesters), polyanions (i.e. fluorocarbon-modified polyanions) such as polyacrylic acid (i.e. fluorocarbon-modified polyacrylic acid) or polyacrylates (i.e. fluorocarbon-modified polyacrylates), and polyurethanes (i.e. fluorocarbon-modified polyurethanes). These fluorocarbon side chains or perfluoro compounds are generally produced by a telomerisation process and are referred to as $C_8$ fluorocarbons. For example, a fluoropolymer or fluorocarbon resin may be derived from the telomerisation of an unsaturated fluoro-compound, forming a fluorotelomer, where said fluorotelomer is further modified to allow reaction with a polyether, polyester, polyanion, polyacrylic acid, polyacrylate or polyurethane, and where the fluorotelomer is then grafted onto a polyether, polyester, polyanion, polyacrylic acid, polyacrylate or polyurethane. Good representative examples of these fluorocarbon-containing polymers are NUVA® fluoropolymer products, commercially available from Clariant International, Ltd. of Switzerland. Other fluorocarbon resins, fluoro-oligomers and fluoropolymers having perfluoro acid-based and perfluoro alcohol-based side chains are also most preferred. Fluoropolymers and fluorocarbon resins having fluorocarbon side chains of shorter lengths, such as $C_6$, $C_4$ or $C_2$, are also suitable, such as PolyFox™ fluorochemicals, commercially available from Omnova Solutions, Inc. of Fairlawn, Ohio.

While fluoropolymers and fluorocarbon resins provide the desired environmental barrier properties, they tend to lack optimal processability and flexibility properties, as well as other physical properties generally considered useful in ballistic resistant composites. Accordingly, the fluorine-containing polymeric binder compositions preferred herein are blends of a fluoropolymer or fluorocarbon-containing (resin) component together with at least one non-fluorocarbon-containing polymeric component that is conventionally used for the formation of ballistic resistant composites. Generally, the fluorocarbon-containing component and non-fluorocarbon-containing component are both wet (i.e. in the molten or liquid state) when they are blended to facilitate their miscibility and blendability, and are applied to the fibers as a wet blend.

Commonly known conventional, non-fluorine-containing polymeric binder materials include both low modulus, elastomeric materials and high modulus, rigid materials. Preferred low modulus, elastomeric materials are those having an initial tensile modulus less than about 6,000 psi (41.3 MPa), and preferred high modulus, rigid materials are those having an initial tensile modulus at least about 100,000 psi (689.5 MPa), each as measured at 37° C. by ASTM D638. As used herein throughout, the term tensile modulus means the modulus of elasticity as measured by ASTM 2256 for a fiber and by ASTM D638 for a polymeric composition material.

An elastomeric polymeric binder component may comprise a variety of materials. A preferred elastomeric binder component comprises a low modulus elastomeric material. For the purposes of this invention, a low modulus elastomeric material has a tensile modulus, measured at about 6,000 psi (41.4 MPa) or less according to ASTM D638 testing procedures. Preferably, the tensile modulus of the elastomer is about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature (Tg) of the elastomer is preferably less than about 0° C., more preferably the less than about −40° C., and most preferably less than about −50° C. The elastomer also has a preferred elongation to break of at least about 50%, more preferably at least about 100% and most preferably has an elongation to break of at least about 300%.

A wide variety of materials and formulations having a low modulus may be utilized in the polymeric composition. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, silicone elastomers, copolymers of ethylene, and combinations thereof, and other low modulus polymers and copolymers. Also preferred are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. The most preferred low modulus polymeric binder materials comprise styrenic block copolymers, particularly polystyrene-polyisoprene-polystrene-block copolymers, sold under the trademark KRATON® commercially produced by Kraton Polymers and HYCAR® T122 acrylic resins commercially available from Noveon, Inc. of Cleveland, Ohio.

Preferred high modulus, rigid polymers useful as components of the polymeric binder compositions of the invention include materials such as a vinyl ester polymer or a styrene-butadiene block copolymer, and also mixtures of polymers such as vinyl ester and diallyl phthalate or phenol formaldehyde and polyvinyl butyral. A particularly preferred high modulus material is a thermosetting polymer, preferably soluble in carbon-carbon saturated solvents such as methyl ethyl ketone, and possessing a high tensile modulus when cured of at least about $1\times10^5$ psi (689.5 MPa) as measured by ASTM D638. Particularly preferred rigid materials are those described in U.S. Pat. No. 6,642,159, which is incorporated herein by reference.

The rigidity, impact and ballistic properties of the articles formed from the fabric composites of the invention are affected by the tensile modulus of the polymeric binder composition polymer. For example, U.S. Pat. No. 4,623,574 discloses that fiber reinforced composites constructed with elastomeric matrices having tensile moduli less than about 6000 psi (41,300 kPa) have superior ballistic properties compared both to composites constructed with higher modulus polymers, and also compared to the same fiber structure without a polymeric binder composition. However, low tensile modulus polymeric binder composition polymers also yield lower rigidity composites. Further, in certain applications, particularly those where a composite must function in both anti-ballistic and structural modes, there is needed a superior combination of ballistic resistance and rigidity. Accordingly, the most appropriate type of polymeric binder composition polymer to be used will vary depending on the type of article to be formed from the fabrics of the invention. In order to achieve a compromise in both properties, a suitable polymeric binder composition may combine both low modulus and high modulus materials to form a single polymeric binder composition.

In the preferred embodiments of the invention, the fluorine-containing polymeric binder compositions of the invention comprises a blend of a fluoropolymer or a fluorocarbon-containing material or both and at least one additional polymer comprising a polyurethane polymer, a polyether polymer, a polyester polymer, a polycarbonate resin, a polyacetal polymer, a polyamide polymer, a polybutylene polymer, an ethylene-vinyl acetate copolymer, an ethylene-vinyl alcohol copolymer, an ionomer, a styrene-isoprene copolymer, a styrene-butadiene copolymer, a styrene-ethylene/butylene copolymer, a styrene-ethylene/propylene copolymer, a polymethyl pentene polymer, a hydrogenated styrene-ethylene/butylene copolymer, a maleic anhydride functionalized styrene-ethylene/butylene copolymer, a carboxylic acid functionalized styrene-ethylene/butylene copolymer, an acrylonitrile polymer, an acrylonitrile butadiene styrene copolymer, a polypropylene polymer, a polypropylene copolymer, an epoxy resin, a novolac resin, a phenolic resin, a vinyl ester resin, a silicone resin, a nitrile rubber polymer, a natural rubber polymer, a cellulose acetate butyrate polymer, a polyvinyl butyral polymer, an acrylic polymer, an acrylic copolymer or an acrylic copolymer incorporating non-acrylic monomers.

In the most preferred embodiments of the invention, the fluorine-containing polymeric binder composition comprises a combination of a fluoropolymer or a fluorocarbon-containing material with an acrylic polymer. Preferred acrylic polymers non-exclusively include acrylic acid esters, particularly acrylic acid esters derived from monomers such as methyl acrylate, ethyl acrylate, n-propyl acrylate, 2-propyl acrylate, n-butyl acrylate, 2-butyl acrylate and tert-butyl acrylate, hexyl acrylate, octyl acrylate and 2-ethylhexyl acrylate. Preferred acrylic polymers also particularly include methacrylic acid esters derived from monomers such as methyl methacrylate, ethyl methacrylate, n-propyl methacrylate, 2-propyl methacrylate, n-butyl methacrylate, 2-butyl methacrylate, tert-butyl methacrylate, hexyl methacrylate, octyl methacrylate and 2-ethylhexyl methacrylate. Copolymers and terpolymers made from any of these constituent monomers are also preferred, along with those also incorporating acrylamide, n-methylol acrylamide, acrylonitrile, methacrylonitrile, acrylic acid and maleic anhydride. Also suitable are modified acrylic polymers modified with non-acrylic monomers. For example, acrylic copolymers and acrylic terpolymers incorporating suitable vinyl monomers such as: (a) olefins, including ethylene, propylene and isobutylene; (b) styrene, N-vinylpyrrolidone and vinylpyridine; (c) vinyl ethers, including vinyl methyl ether, vinyl ethyl ether and vinyl n-butyl ether; (d) vinyl esters of aliphatic carboxylic acids, including vinyl acetate, vinyl propionate, vinyl butyrate, vinyl laurate and vinyl decanoates; and (f) vinyl halides, including vinyl chloride, vinylidene chloride, ethylene dichloride and propenyl chloride. Vinyl monomers which are likewise suitable are maleic acid diesters and fumaric acid diesters, in particular of monohydric alkanols having 2 to 10 carbon atoms, preferably 3 to 8 carbon atoms, including dibutyl maleate, dihexyl maleate, dioctyl maleate, dibutyl fumarate, dihexyl fumarate and dioctyl fumarate.

Acrylic polymers and copolymers are preferred because of their inherent hydrolytic stability, which is due to the straight carbon backbone of these polymers. Acrylic polymers are also preferred because of the wide range of physical properties available in commercially produced materials. The range of physical properties available in acrylic resins matches, and perhaps exceeds, the range of physical properties thought to be desirable in polymeric binder compositions of ballistic resistant composite matrix resins.

The polymeric binder compositions preferably further comprise at least one surfactant. It has been unexpectedly found that the addition of a surfactant to a fluorine-containing blended polymeric binder composition achieves uniformity of the binder coating on the individual fibers. It has also been unexpectedly found that the addition of a surfactant promotes the uniform distribution of the fluorocarbon resin at the surfaces of the blended polymeric matrix binder. These surfaces or interfaces can be described as the air-to-blended polymeric matrix binder interface, or outside surface, and the fiber-to-blended polymeric matrix binder interface, or inside surface. This uniform distribution of the fluorocarbon resin at the surfaces increases the effectiveness of the fluorocarbon resin in regards to its enhancing the environmental resistance (salt water, gasoline, etc.) of the composite.

Suitable surfactants non-exclusively include anionic, cationic, amphoteric and non-ionic surfactants. Generally, non-ionic surfactants are preferred because they have the most limited solubility in water and do not form salts with anionic surfactants. Further, the polymeric binder dispersions are very sensitive to anionic and cationic surfactants because the high charge density may lead to coagulation of the dispersions. Non-ionic surfactants typically do not interfere with the nature of the dispersed polymers (micelles containing solids), or exhibit minimal interference. Preferred non-ionic surfactants include non-ionic surfactants based on fatty acids and fatty alcohols, particularly those having hydrophile-lipophile balance (HLB) values of 7 to 10. A particularly preferred surfactant is a non-ionic polyethylene-glycol-trimethylnonyl-ether, such as TERGITOL® TMN-3 surfactant commercially available from Dow Chemical Company of Midland, Mich. TERGITOL® TMN-3 is preferred because it provides a low surface tension at a low concentration. Low surface tension is desired to make sure the dispersion spreads well and covers each individual fiber. TERGITOL® TMN-3 has an HLB value of approximately 8 and exhibits carbon chain branching that helps reducing surface tension. Also useful are non-ionic fluorosurfactants, such as Fluowet® fluorosurfactants from Clariant GmbH Corporation of Germany, particularly Fluowet® OTN. However, fluorosurfactants may not be acceptable due to environmental concerns. Also useful are silicone surfactants in combination with ethoxylated castor oils that are partially end-capped with oleic acid.

Besides the incorporation of a surfactant, other factors also may increase the concentration of fluorine-containing component at the outer fabric surface. For example, most polymers have limited compatibility with fluoropolymers and fluorocarbon resins, but in a blended emulsion or dispersion state the polymers are not in direct contact with one another. The compatibility or stability of the blended emulsion or dispersion can be independent of the compatibility of the constituent polymers. In an emulsion or dispersion, groups of polymer chains are segregated into discreet regions, surrounded by the emulsifying agent or surfactant, and suspended into a carrier solvent. An ethoxylated end capped castor oil is an example of an emulsifier. There can be discreet regions containing each of the polymers in a stable emulsion or a dispersion. These discreet regions can be alternately described as micelles, colloids, aggregates, particles or other appropriate terms. Once the blended emulsion/dispersion is applied to the substrate (e.g. filament, fiber, fabric) and the carrier solvent is removed by drying, the micelles will begin to contact one another and coalesce, and the individual polymer chains will begin to untangle, open up and potentially mix with polymer chains from other discreet regions. At this stage the compatibility of resins in a blended emulsion/dispersion is considered.

In the case where the two or more polymers in a blended emulsion or dispersion are completely compatible, the polymer chains of the polymers will form a homogeneously blended mixture upon removal of the carrier solvent. In the complementary case where the polymers in a blended emulsion or dispersion are not compatible, the polymer chains of the polymers will maintain a degree of discreet separation upon removal of the carrier solvent. The topography or nature of that discreetness is determined by many factors, including the relative molecular weights of the different polymers, the flexibility of the polymer chains, the tendency of the polymer chains to resist entanglement, any bias in the affinity of a surfactant for one of the polymers over another, any bias in the affinity of the polymers for the surface of the substrate, as well as other considerations.

In cases where the component polymers have partial, marginal or limited compatibility with each other, the topography may tend to be some combination of the two extreme scenarios. This topography can be manipulated to the benefit of the formulator. The primary matrix resin, perhaps a low modulus, high elongation acrylic of high molecular weight, will be chosen for its physical properties, which should be suitable for the end use. The proportion of the primary matrix resin (i.e. the non-fluorine-containing component) to the fluorine-containing component should be set to allow the physical properties of the blended matrix composition to be dominated by the physical properties of the primary matrix resin. At a minimum, the primary matrix resin should be in excess of the fluorine-containing component(s). The physical properties of the fluorine-containing component(s) are of secondary importance. The fluorine-containing component or components will be chosen due to their ability to repel water and gasoline, as well as their ability to be compounded into a stable blended emulsion/dispersion with the primary matrix resin. Also, the selected fluoropolymer(s) and/or fluorocarbon resin(s) of the fluorine-containing component should have limited compatibility with the primary matrix resin, to encourage the formation of discreet regions of the two resins upon removal of the carrier solvent. Additionally, if the chosen fluoropolymer(s) or fluorocarbon resin(s) also have molecular weights significantly lower than the primary matrix resin, it will be the polymer more likely to migrate towards the boundaries of the bulk blended matrix, concentrating its discreet regions at those boundaries.

Accordingly, in the preferred embodiments of the invention, the fluorine-containing component comprises from about 1% by weight to about 50% by weight of the fluorine-containing polymeric binder composition. More preferably, the fluorine-containing component comprises from about 3% to about 35% by weight of the fluorine-containing polymeric binder composition, more preferably from about 5% to about 25% by weight, and more preferably from about 5% to about 20% by weight of the fluorine-containing polymeric binder composition. A range of about 10% to about 20% is also preferred.

In the preferred embodiment of the invention, a surfactant is present and comprises from about 0.01% to about 10% by weight of the polymeric binder composition, more preferably from about 0.05% to about 5% by weight, and most preferably from about 0.1% to about 2.5% by weight of the polymeric binder composition. The polymeric composition may also include fillers such as carbon black or silica, may be extended with oils, or may be vulcanized by sulfur, peroxide, metal oxide or radiation cure systems as is well known in the art.

To produce a fabric article having sufficient ballistic resistance properties, the proportion of fibers forming the fabric preferably comprises from about 50% to about 98% by weight of the fibers plus the polymeric binder composition, more preferably from about 70% to about 95%, and most preferably from about 78% to about 90% by weight of the fibers plus the polymeric binder composition. Thus, the polymeric binder composition preferably comprises from about 2% to about 50% by weight of the fabric, more preferably from about 5% to about 30% and most preferably from about 10% to about 22% by weight of the fabric, wherein 16% is most preferred.

The application of the polymeric binder composition is conducted prior to consolidating the fiber plies, and the multilayer coating is to be applied on top of any pre-existing fiber finish, such as a spin finish. The fibers of the invention may be coated on, impregnated with, embedded in, or otherwise applied with a polymeric binder composition by applying the composition to the fibers, followed by consolidating the coated fibers to form a composite. The fluorine-containing polymeric binder composition may first be applied onto a plurality of fibers followed by forming at least one fiber ply from said fibers, where the individual fibers are coated either sequentially or consecutively. Alternately, at least one fiber ply may be formed first followed by applying a fluorine-containing polymeric binder composition onto said at least one fiber ply. For the purposes of the present invention, the term "coated" is not intended to limit the method by which the polymeric binder composition is applied onto the fiber surfaces and any appropriate method of applying the polymeric composition onto the fiber surfaces may be utilized. For example, the polymeric binder composition may be applied in solution form by spraying or roll coating a solution of the composition onto fiber surfaces, wherein a portion of the solution comprises the desired polymer or polymers and a portion of the solution comprises a solvent capable of dissolving the polymer or polymers, followed by drying. Another method is to apply a neat polymer of the coating material to fibers either as a liquid, a sticky solid or particles in suspension or as a fluidized bed. Alternatively, the coating may be applied as a solution, emulsion or dispersion in a suitable solvent which does not adversely affect the properties of the fiber at the temperature of application. For example, the fiber can be transported through a solution of the polymeric binder composition to substantially coat the fiber and then dried to form a coated fiber. The resulting coated fiber is then arranged into the desired configuration. In another coating technique, fiber plies or woven fabrics may first be arranged, followed by dipping the plies or fabrics into a bath of a solution containing the polymeric binder composition dissolved in a suitable solvent, such that each individual fiber is at least partially coated with the polymeric binder composition, and then dried through evaporation or volatilization of the solvent. The dipping procedure may be repeated several times as required to place a desired amount of polymeric binder composition coating onto the fibers, preferably encapsulating each of the individual fibers or covering all or substantially all of the fiber surface area with the polymeric binder composition.

While any liquid capable of dissolving or dispersing a polymer may be used, preferred groups of solvents include water, paraffin oils and aromatic solvents or hydrocarbon solvents, with illustrative specific solvents including paraffin oil, xylene, toluene, octane, cyclohexane, methyl ethyl ketone (MEK) and acetone. The techniques used to dissolve or disperse the coating polymers in the solvents will be those conventionally used for the coating of similar materials on a variety of substrates.

Other techniques for applying the coating to the fibers may be used, including coating of the high modulus precursor (gel fiber) before the fibers are subjected to a high temperature stretching operation, either before or after removal of the solvent from the fiber (if using a gel-spinning fiber forming technique). The fiber may then be stretched at elevated temperatures to produce the coated fibers. The gel fiber may be passed through a solution of the appropriate coating polymer under conditions to attain the desired coating. Crystallization of the high molecular weight polymer in the gel fiber may or may not have taken place before the fiber passes into the solution. Alternatively, the fibers may be extruded into a fluidized bed of an appropriate polymeric powder. Furthermore, if a stretching operation or other manipulative process, e.g. solvent exchanging, drying or the like is conducted, the coating may be applied to a precursor material of the final fibers. In the most preferred embodiment of the invention, the fibers of the invention are first coated with the polymeric binder composition, followed by arranging a plurality of fibers into either a woven or non-woven fabric. Such techniques are well known in the art.

As is well known in the art, consolidation is done by positioning the individual fiber plies on one another under conditions of sufficient heat and pressure to cause the plies to combine into a unitary fabric. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that the polymeric binder composition can be caused to stick or flow without completely melting. However, generally, if the polymeric binder composition material is caused to melt, relatively little pressure is required to form the composite, while if the polymeric binder composition material is only heated to a sticking point, more pressure is typically required. Consolidation may also be achieved by a wet lamination of the first fibrous web to the second fibrous web without requiring heat and/or pressure. As is conventionally known in the art, consolidation may be conducted in a calender set, a flat-bed laminator, a press or in an autoclave.

Alternately, consolidation may be achieved by molding under heat and pressure in a suitable molding apparatus. Generally, molding is conducted at a pressure of from about 50 psi (344.7 kPa) to about 5000 psi (34470 kPa), more preferably about 100 psi (689.5 kPa) to about 1500 psi (10340 kPa), most preferably from about 150 psi (1034 kPa) to about 1000 psi (6895 kPa). Molding may alternately be conducted at higher pressures of from about 500 psi (3447 kPa) to about 5000 psi, more preferably from about 750 psi (5171 kPa) to about 5000 psi and more preferably from about 1000 psi to about 5000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. (~149° C.) and most preferably at a temperature from about 200° F. to about 280° F. (~121° C.). The pressure under which the fabrics of the invention are molded has a direct effect on the stiffness or flexibility of the resulting molded product. Particularly, the higher the pressure at which the fabrics are molded, the higher the stiffness, and vice-versa. In addition to the molding pressure, the quantity, thickness and composition of the fabric plies and polymeric binder composition type also directly affects the stiffness of the articles formed from the inventive fabrics.

While each of the molding and consolidation techniques described herein are similar, each process is different. Particularly, molding is a batch process and consolidation is a continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft body armor fabrics. Molding is typically reserved for the manufacture of hard armor, e.g. rigid plates. In the context of the present invention, consolidation techniques and the formation of soft body armor are preferred.

In either process, suitable temperatures, pressures and times are generally dependent on the type of polymeric binder coating materials, polymeric binder content (of the combined coatings), process used and fiber type. The fabrics formed herein may optionally be calendered under heat and pressure to smooth or polish their surfaces. Calendering methods are well known in the art.

The thickness of the individual fabrics will correspond to the thickness of the individual fibers. A preferred woven fabric will have a preferred thickness of from about 25 µm to about 500 µm per layer, more preferably from about 50 µm to about 385 µm and most preferably from about 75 µm to about 255 µm per layer. A preferred non-woven fabric, i.e. a non-woven, single-layer, consolidated network, will have a preferred thickness of from about 12 µm to about 500 µm, more preferably from about 50 µm to about 385 µm and most preferably from about 75 µm to about 255 µm, wherein a single-layer, consolidated network typically includes two consolidated plies (i.e. two unitapes), with the exception of the COMPARATIVE A composite utilized in the comparative examples, where a single layer of the composite includes four plies. While such thicknesses are preferred, it is to be understood that other thicknesses may be produced to satisfy a particular need and yet fall within the scope of the present invention.

The fabrics of the invention will have a preferred areal density of from about 50 grams/m$^2$ (gsm) (0.01 lb/ft$^2$ (psf)) to about 1000 gsm (0.2 psf). More preferable areal densities for the fabrics of this invention will range from about 70 gsm (0.014 psf) to about 500 gsm (0.1 psf). The most preferred areal density for fabrics of this invention will range from about 100 gsm (0.02 psf) to about 250 gsm (0.05 psf). The articles of the invention, which consist of multiple individual layers of fabric stacked one upon the other, will further have a preferred areal density of from about 1000 gsm (0.2 psf) to about 40,000 gsm (8.0 psf), more preferably from about 2000 gsm (0.40 psf) to about 30,000 gsm (6.0 psf), more preferably from about 3000 gsm (0.60 psf) to about 20,000 gsm (4.0 psf), and most preferably from about 3750 gsm (0.75 psf) to about 10,000 gsm (2.0 psf).

The structures of the invention may be used in various applications to form a variety of different ballistic resistant articles using well known techniques. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758. The structures are particularly useful for the formation of flexible, soft armor articles, including garments such as vests, pants, hats, or other articles of clothing, and covers or blankets, used by military personnel to defeat a number of ballistic threats, such as 9 mm full metal jacket (FWJ) bullets and a variety of fragments generated due to explosion of hand-grenades, artillery shells, Improvised Explosive Devices (IED) and other such devises encountered in a military and peace keeping missions. As used herein, "soft" or "flexible" armor is armor that does not retain its shape when subjected to a significant amount of stress and is incapable of being free-standing without collapsing. The structures are also useful for the formation of rigid, hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. The structures can be cut into a plurality of discrete sheets and stacked for formation into an article or they can be formed into a precursor which is subsequently used to form an article. Such techniques are well known in the art.

Garments of the invention may be formed through methods conventionally known in the art. Preferably, a garment may be formed by adjoining the ballistic resistant articles of the invention with an article of clothing. For example, a vest may comprise a generic fabric vest that is adjoined with the ballistic resistant structures of the invention, whereby the inventive structures are inserted into strategically placed pockets. This allows for the maximization of ballistic protection, while minimizing the weight of the vest. As used herein, the terms "adjoining" or "adjoined" are intended to include attaching, such as by sewing or adhering and the like, as well as un-attached coupling or juxtaposition with another fabric, such that the ballistic resistant articles may optionally be easily removable from the vest or other article of clothing. Articles used in forming flexible structures like flexible sheets, vests and other garments are preferably formed from using a low tensile modulus binder composition. Hard articles like helmets and armor are preferably formed using a high tensile modulus binder composition.

The ballistic resistance properties are determined using standard testing procedures that are well known in the art. Particularly, the protective power or penetration resistance of a structure is normally expressed by citing the impacting velocity at which 50% of the projectiles penetrate the composite while 50% are stopped by the shield, also known as the $V_{50}$ value. As used herein, the "penetration resistance" of an article is the resistance to penetration by a designated threat, such as physical objects including bullets, fragments, shrapnel and the like, and non-physical objects, such as a blast from explosion. For composites of equal areal density, which is the weight of the composite divided by its area, the higher the $V_{50}$, the better the ballistic resistance of the composite.

The ballistic resistant properties of the articles of the invention will vary depending on many factors, particularly the type of fibers used to manufacture the fabrics, the percent by weight of the fibers in the composite, the suitability of the physical properties of the resin matrix, the number of layers of fabric making up the composite and the total areal density of the composite. However, the use of a polymeric binder composition that is resistant to dissolution or penetration by sea water, and resistant to dissolution or penetration by one or more organic solvents, does not negatively affect the ballistic properties of the articles of the invention.

The following examples serve to illustrate the invention:

EXAMPLES

Various fabric samples were tested as exemplified below by Example 1-12 and Comparative Examples 1-6. Table 1A describes the polymeric binder compositions used to manufacture the samples of the invention, tested in the inventive examples. Table 1B describes the fabric samples tested in the comparative examples. Table 2 describes the fabric structures. As referenced below, the water-based acrylic polymer Hycar® T122 is a copolymer of ethyl acrylate, n-butyl acrylate and a carboxylic acid-containing monomer, along with an anionic surfactant. It is commercially available from Noveon, Inc. of Cleveland, Ohio. Hycar® T122 is particularly preferred due to its high elongation of 1200% and low tensile strength of 530 psi, which properties are suitable for flexible ballistic composites. The binder composition designated as T122T is the T122 modified with a small amount of TERGITOL® TMN-3 non-ionic surfactant. The binder composition designated as T122FC are the same as T122 but modified with approximately 10% of Nuva® LB fluorocarbon resin. The binder compositions designated as T122FC2A, T122FC2B and T122FC2C are the same as T122 but modified with approximately 20% of Nuva® LB fluorocarbon resin.

The surfactant TERGITOL® TMN-3, commercially available from Dow Chemical Company, is a non-ionic branched secondary alcohol ethoxylate, primarily polyethylene-glycol-trimethylnonyl-ether. Nuva® LB is a fluorocarbon resin derived from telomerisation of tetrafluoroethylene. It is commercially available from Clariant International, Ltd.

COMPARATIVE A fabrics were non-woven, aramid-based fabrics. They have a four-ply (four unitape), 0°/90°/0°/90° non-woven construction with a low density polyethylene (LDPE) film laminated to each outer fabric surface. The fabrics are manufactured from 1000-denier TWARON® type 2000 aramid fibers having a fiber areal density (FAD) of 45 gsm, and include a binder composition comprising a KRATON® emulsion binder.

COMPARATIVE B and COMPARATIVE C fabrics were non-woven polyethylene-based fabrics. Both have a two-ply (two unitape), 0°/90° non-woven construction, with an LDPE film laminated to each outer fabric surface. COMPARATIVE B fabrics are manufactured from 1300-denier polyethylene fibers having an FAD of 34 gsm, and include a binder composition comprising a water-based KRATON® SIS block copolymer (binder content: 15%). The COMPARATIVE C fabrics are manufactured from 1100-denier polyethylene fibers having an FAD of 37 gsm, and include a binder composition comprising a solvent-based KRATON® polystyrene-polyisoprene-polystrene block copolymer (SB SIS) (binder content: 20.5%).

TABLE 1A

| Binder Formula | Components | Description | Amount |
|---|---|---|---|
| T122 | Noveon HYCAR ® T122 | Water-based Acrylic | 100% |
| T122T | Noveon HYCAR ® T122 | Water-based Acrylic | 99% |
| | Dow TERGITOL ® TMN-3 | Non-ionic Surfactant | 1% |
| T122FC | Noveon HYCAR ® T122 | Water-based Acrylic | 89% |
| | Dow TERGITOL ® TMN-3 | Non-ionic Surfactant | 1% |
| | Clariant NUVA ® LB | Fluorocarbon Resin | 10% |
| T122FC2 | Noveon HYCAR ® T122 | Water-based Acrylic | 79% |
| | Dow TERGITOL ® TMN-3 | Non-ionic Surfactant | 1% |
| | Clariant NUVA ® LB | Fluorocarbon Resin | 20% |

TABLE 1B

| Fabric Sample | Fabric Description |
|---|---|
| COMPARATIVE A | 4-ply non-woven, aramid-based fabric; water-based KRATON ® emulsion binder |
| COMPARATIVE B | 2-ply 1300 denier polyethylene-based fabric; water-based KRATON ® binder |
| COMPARATIVE C | 2-ply 1100 denier polyethylene-based fabric; solvent-based KRATON ® binder |

TABLE 2

Description of Samples

| Examples | Type of Resin or Product Name | Resin Content (wt. %) | Fiber Content (wt. %) | Single Ply FAD | Plies per Fabric Layer | Single Layer TAD |
|---|---|---|---|---|---|---|
| 1 and 7 | T122 | 16 | 84 | 45 gsm | 2 | 107 gsm |
| 2 and 8 | T122T | 15.8 | 84.2 | 45 gsm | 2 | 107 gsm |
| 3 and 9 | T122FC | 17 | 83 | 45 gsm | 2 | 108 gsm |
| 4 and 10 | T122FC2A | 14.7 | 85.3 | 45 gsm | 2 | 105 gsm |
| 5 and 11 | T122FC2B | 17 | 83 | 45 gsm | 2 | 108 gsm |
| 6 and 12 | T122FC2C | 19 | 81 | 45 gsm | 2 | 111 gsm |
| Comp. 1 Comp. 4 | COMPARATIVE A | 16* | 77.6* | 45 gsm | 4 | 232 gsm |
| Comp. 2 Comp. 5 | COMPARATIVE B | 15* | 71.6* | 34 gsm | 2 | 95 gsm |
| Comp. 3 Comp. 6 | COMPARATIVE C | 20.5* | 65.5* | 37 gsm | 2 | 113 gsm |

*The balance of the weight is represented by protective films laminated to the outer fabric surfaces.

Articles of ballistic resistant armor can be designed and constructed so as to achieve a desired $V_{50}$ by adding or subtracting individual layers of ballistic resistant fabric. For the purpose of these experiments, the construction of the articles was standardized by stacking a sufficient number of fabric layers such that the Total Areal Density (TAD) (areal density of fabrics including the fibers and the polymeric binder composition) of the article was 1.00±0.02 psf. Depending on the TAD of the individual fabric layers, the count of layers required to maintain the article's targeted TAD between 0.98 psf and 1.02 psf ranged between 44 and 47. Each of these stacks of fabric was then placed into a nylon fabric rip-stop carrier, which was then stitched closed. At this point, the assembly was considered to be the ballistic article sample upon which testing would be done.

Each of the fabrics employed in inventive Examples 1-12 were non-woven 0°/90° fabrics constructed using a binder composition (specified in Table 1A) that was applied to a unidirectional web (unidirectional tape, i.e. unitape) of a high-performance, 1000-denier (1100 dtex) Twaron® Type 2000 aramid fiber, available from Teijin of Japan. Two perpendicular (0°/90°) plies of this unitape were then consolidated (consolidation conditions: 500 PSI @ 240° F. (133.3° C.) for 30 minutes) into one integrated fabric. The Fiber Areal Density (FAD) of each ply of unitape was 45 gsm. Including the polymeric binder composition, the TAD of each single unitape ply ranged from 52.5 gsm to 55.5 gsm. The TAD of each fabric layer (equal to twice the TAD of each single ply) ranged from 105 gsm to 111 gsm. Each layer of fabric was a nominal 12"×12" square cut out from the two-ply, non-woven fabric. These fabric layers were then assembled into an article, as described above. The varying polymeric resin matrix binder compositions, used to produce these fabrics are indicated in Table 1A.

The $V_{50}$ ballistic resistance of several different fabric test packs was evaluated after submersion in salt water and after submersion in gasoline, respectively. The results are outlined in Examples 1-12, Comparative Examples 1-6, and Tables 3 and 4 below. The procedures for the ballistic evaluation after environmental exposure to salt water and gasoline, and for the preparation of the test samples are outlined as follows:

A. Procedure for the Ballistic Evaluation of a Polymeric Binder Composition after Environmental Exposure Hardware:
1. Salt water immersion tray—plastic, flat-bottom open-top containers, 18" wide by 24" long by 6" deep.
2. Drying frame and clips.
3. Gasoline immersion chamber—stainless steel enclosure, approximately 24-inches wide by 24-inches deep by 36-inches high. The enclosure includes a front access door, a top access lid and several mounting bars bridging the left and right walls, one-inch from the top of the walls.
4. Gasoline immersion transport carrier.
5. Weighing scale.
6. Indelible marker pen.
7. Timer.
8. Ballistic mounting frame.
9. Ballistics range capable of firing and determining the velocity of 16-grain RCC fragments.

Materials:
1. 12-inch by 12-inch squares of the non-woven fabrics to be evaluated.
2. 13-inch by 13-inch nylon "rip-stop" carriers.
3. De-ionized water.
4. Sea Salt (or mixture of Sodium Chloride and Magnesium Chloride).
5. 5 Gallons of U.S. regular-grade (87-octane, unleaded) gasoline.
6. 16-grain RCC fragments.

B. Procedure for Preparing the Test Packs
1. Ten 12-inch by 12-inch square samples of fabric were weighed to determine an average weight of a fabric sample.
2. The number of these samples required to equal 1.00 lb.+/− 0.02 lb was determined. This number was defined as the "Layer Count".
3. Twelve stacks of the 12-inch by 12-inch squares were prepared. The number of 2-ply layers of fabric (or 4-ply for COMPARATIVE A fabric) in each stack was the same as the "Layer Count", and a consistent orientation of the fibers in each sample was maintained (i.e. the fibers of the top ply in each sample were all pointed in the same direction).
4. When all twelve stacks had the required "Layer Count", each stack was weighed to determine whether an adjustment in the "Layer Count" was needed to achieve a nominal 1.00 lb. test pack (shoot pack). Any discrepancy in the number of layers between stacks was adjusted to have twelve equivalent stacks of 1.00 lb. fabric samples.
5. Once twelve equivalent stacks of 1.00 lb. fabric layers were formed, each was inserted into a 13-inch by 13-inch nylon "rip-stop" carrier. The open end of the carrier was sewn to contain the test pack. Each carrier/test pack was corner stitched.
6. Using an indelible marker, all of the particulars of each test pack were recorded, including a unique identifier for each test pack on to the surface of the carrier. The test packs were re-weighed including the nylon carrier.
7. The twelve test packs were separated into four groups of three test packs: one group was used as the dry control for salt water immersion testing; another group was used for salt water immersion testing; another group was used as the dry control for gasoline immersion testing; and the final group was used for gasoline immersion testing.

C. 24-Hour Salt Water Immersion
1. Two full 500-gram containers of Morton Sea Salt were poured into an empty and clean salt water immersion tray. This salt was covered with 7 gallons of clear-running tap water. The tray was filled to approximately 3-inches of its 6-inch depth and stirred with a spatula until all of the salt dissolved. Instead of Morton Sea Salt a solution of 3.0% Sodium Chloride and 0.5% Magnesium Chloride in tap water may be used.
2. One of the samples from the group designated for salt water immersion testing was selected and its dry weight was verified to match the weight that was previously recorded.
3. The first of the salt water immersion test samples was completely submerged into the salt water solution. At one hour intervals, one more test pack was submerged into the salt water solution.
4. Once the first test pack was submerged in the salt water solution for 24 hours, the sample was ready for ballistic testing.

D. Ballistic Testing for Salt Water Immersion
1. The test pack was removed from the salt water solution, hung by one corner from the drying frame and allowed to drip-dry for 15 minutes.
2. The drip-dried sample was transported to the ballistics range and weighed to record its wet weight.
3. The sample was inserted into the ballistic mounting frame and this assembly was placed into the firing range.
4. A series of 16-grain RCC fragments were shot into the sample according to the MIL-STD-662E testing method. The velocity of the projectiles was adjusted to achieve a mixture of complete penetrations of the sample and partial penetrations of the sample. The velocity of each shot was measured and a $V_{50}$ for the sample was determined using accepted statistical analysis tools.
5. Thereafter, one of the samples from the dry control group was tested according to steps 3 and 4 for comparison.
6. The above steps were continued for all the designated salt water immersion testing samples and dry control samples and a $V_{50}$ was determined for each.

E. 4-HOUR GASOLINE IMMERSION
1. Five gallons of U.S. regular grade (87-octane, unleaded) gasoline were poured into the gasoline immersion chamber.
2. One of the samples from the group designated for gasoline immersion testing was selected and its dry weight was verified to match the weight that was previously recorded.
3. The first of the gasoline immersion test samples was completely submerged into the gasoline. At one hour intervals, one more test pack was submerged into the gasoline.
4. Once the first test pack was submerged in the Gasoline Immersion Chamber for 4 hours, the first sample was ready for ballistic testing.

F. Ballistic Testing for Gasoline Immersion
1. After 4 hours, the first sample was lifted out of the gasoline and clipped to one of the mounting bars across the top of the chamber. The sample was allowed to drip-dry for 15 minutes.
2. After the 15 minute drip-dry, the sample was removed from the mounting bar and placed into the gasoline immersion transport carrier and the lid closed.
3. The carrier was then transported to the ballistics laboratory, and the sample was weighed to record its wet weight.
4. The sample was inserted into the ballistic mounting frame and this assembly was placed into the firing range.
5. A series of 16-grain RCC fragments were shot into the sample according to the MIL-STD-662E testing method. The velocity of the projectiles was adjusted to achieve a mixture of complete penetrations of the sample and partial penetrations of the sample. The velocity of each shot was measured and a $V_{50}$ for the sample was determined using accepted statistical analysis tools.

6. Thereafter, one of the samples from the dry control group was tested according to steps 3 and 4 for comparison.
7. The above steps were continued for all the designated gasoline immersion testing samples and dry control samples and a $V_{50}$ was determined for each.

G. Results

TABLE 3

SALT WATER IMMERSION TESTING

| Ex. | Type of Resin or Product Name | Layer Count | TAD psf (ksm) | Dry $V_{50}$ fps (mps) | Wet $V_{50}$ fps (mps) | $V_{50}$ Retention % |
|---|---|---|---|---|---|---|
| 1 | T122 | 43 | 0.99 (4.83) | 1959 (505) | 1777 (458) | 90.40% |
| 2 | T122T | 45 | 1.00 (4.88) | 1948 (502) | 1842 (475) | 94.60% |
| 3 | T122FC | 45 | 1.00 (4.88) | 1962 (506) | 1970 (508) | 100.40% |
| 4 | T122FC2A | 47 | 1.00 (4.88) | 2029 (523) | 2010 (518) | 99.10% |
| 5 | T122FC2B | 45 | 1.00 (4.88) | 2046 (527) | 2047 (528) | 100.00% |
| 6 | T122FC2C | 44 | 1.00 (4.88) | 1956 (504) | 1945 (501) | 99.40% |
| Comp 1 | COMPARATIVE A | 21 | 0.99 (4.83) | 1810 (466) | 1394 (359) | 77.00% |
| Comp 2 | COMPARATIVE B | 51 | 0.99 (4.83) | 1977 (510) | 1737 (448) | 87.90% |
| Comp 3 | COMPARATIVE C | 43 | 1.00 (4.88) | 1972 (508) | 1641 (423) | 83.20% |

TABLE 4

GASOLINE IMMERSION TESTING

| Ex. | Type of Resin or Product Name | Layer Count | TAD psf (ksm) | Dry $V_{50}$ fps (mps) | Wet $V_{50}$ fps (mps) | $V_{50}$ Retention % |
|---|---|---|---|---|---|---|
| 7 | T122 | 43 | 0.99 (4.83) | ** | ** | ** |
| 8 | T122T | 45 | 1.00 (4.88) | 1944 (501) | 1630 (420) | 83.8% |
| 9 | T122FC | 45 | 1.00 (4.88) | 1998 (510) | 2014 (519) | 100.8% |
| 10 | T122FC2A | 47 | 1.00 (4.88) | ** | ** | ** |
| 11 | T122FC2B | 45 | 1.00 (4.88) | 1977 (510) | 2014 (519) | 101.8% |
| 12 | T122FC2C | 44 | 1.00 (4.88) | ** | ** | ** |
| Comp. 4 | COMPARATIVE A | 23 | 1.09 (5.32) | 2164 (558) | 1271 (314) | 58.7% |
| Comp. 5 | COMPARATIVE B | 51 | 0.99 (4.83) | 1977 (510) | 1486 (383) | 75.2% |
| Comp. 6 | COMPARATIVE C | 43 | 1.00 (4.88) | 1972 (508) | 1641 (423) | 83.2% |

**Signifies that these samples have not been tested.

For both the salt water immersion and the gasoline immersion, the ratio of the wet weight of sample divided by the original dry weight of sample is taken to be an indication or the sample's tendency to absorb either salt water or gasoline. For example, a 12"×12" sample of a non-woven fabric originally weighs 9.70 grams. After the sample has been immersed in a 3.5% salt water solution and allowed to drip-dry for 15 minutes, its weight increases to 11.28 grams. The ratio of the wet weight to the original weight is 11.28 grams divided by 9.70 grams, or 1.163. Values that are significantly greater than 1 (such as 1.40 or 1.74) indicate that the sample has a high propensity to absorb the fluid. Ratios that are much closer to 1 (such as 0.98 or 1.06) indicate that the sample has a much lower tendency to absorb the fluid.

Alternately, the tendency of a sample to gain weight after immersion in salt water or gasoline can be expressed as the Percent Weight Gain. This value is calculated by subtracting the dry weight of the sample before immersion from the wet weight of the sample after immersion, and then dividing this difference by the original dry weight. The magnitude of this tendency to absorb, by either calculation, is not a definite predictor of the expected ballistic performance after exposure, but a correlation is expected. Table 5 outlines the tendency of the samples used in Examples 1 and 3, and Comparative Examples 1 and 2 to gain weight after immersion in salt water. The other samples were not tested.

TABLE 5

SINGLE LAYER 24-HOUR SALT WATER ABSORPTION

| Ex. | Type of Resin/Fabric | Binder Polymer | Original Weight (grams) | Wet Weight (grams) | Percent Weight Gain |
|---|---|---|---|---|---|
| 1 | T122 | Acrylic | 14.6 | 16.2 | 11.00% |
| 2 | T122T | Acrylic | ** | ** | ** |
| 3 | T122FC | Acrylic/FC | 13.1 | 13.7 | 4.60% |
| 4 | T122FC2A | Acrylic/FC | ** | ** | ** |
| 5 | T122FC2B | Acrylic/FC | ** | ** | ** |
| 6 | T122FC2C | Acrylic/FC | ** | ** | ** |
| Comp 1 | COMPARATIVE A | WB SIS | 22.3 | 39.9 | 78.90% |
| Comp 2 | COMPARATIVE B | WB SIS | 9.8 | 13.4 | 36.70% |
| Comp 3 | COMPARATIVE C | SB SIS | 23.5 | 24.6 | 4.70% |

** Signifies that these samples have not been tested.

For the salt water immersion ballistic testing, the ratio of the average $V_{50}$ of the wet samples to the average $V_{50}$ of the dry control samples is defined as the $V_{50}$ retention % after salt water immersion. For the gasoline immersion ballistic testing, the ratio of the average $V_{50}$ of the wet samples to the average $V_{50}$ of the dry control samples is defined as the $V_{50}$ retention % after gasoline immersion. For example, the three gasoline immersion samples of Example 8 in Table 2, utilizing the T122T binder material, had an average $V_{50}$ of 1630 ft/sec. The three dry control samples for these gasoline soaked samples had an average $V_{50}$ of 1944 ft/sec. Therefore, the $V_{50}$ retention % after gasoline immersion is 1630 divided by 1944, or 83.8%. High $V_{50}$ retention percentages (97% or greater) indicate that the composite fabric is not sensitive to environmental exposure or contamination. Low $V_{50}$ retentions percentages (<90%) indicate that the composite fabric is very sensitive to environmental exposure or contamination.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A ballistic resistant fabric comprising a plurality of fibers arranged in an array, said fibers being united and forming a fabric, said fibers having a tenacity of about 7 g/denier or more and a tensile modulus of about 150 g/denier or more; and said fibers having a fluorine-containing polymeric binder composition on a surface thereof.

2. The ballistic resistant fabric of claim 1 which comprises a woven or non-woven fabric.

3. The ballistic resistant fabric of claim 1 which comprises a felt.

4. The ballistic resistant fabric of claim 1 wherein said fluorine-containing polymeric binder composition comprises a blend of a fluoropolymer or a fluorocarbon-containing material or both and at least one additional polymer comprising a polyurethane polymer, a polyether polymer, a polyester polymer, a polycarbonate resin, a polyacetal polymer, a polyamide polymer, a polybutylene polymer, an ethylene-vinyl acetate copolymer, an ethylene-vinyl alcohol copolymer, an ionomer, a styrene-isoprene copolymer, a styrene-butadiene copolymer, a styrene-ethylene/butylene copolymer, a styrene-ethylene/propylene copolymer, a polymethyl pentene polymer, a hydrogenated styrene-ethylene/butylene copolymer, a maleic anhydride functionalized styrene-ethylene/butylene copolymer, a carboxylic acid functionalized styrene-ethylene/butylene copolymer, an acrylonitrile polymer, an acrylonitrile butadiene styrene copolymer, a polypropylene polymer, a polypropylene copolymer, an epoxy resin, a novolac resin, a phenolic resin, a vinyl ester resin, a silicone resin, a nitrile rubber polymer, a natural rubber polymer, a cellulose acetate butyrate polymer, a polyvinyl butyral polymer, an acrylic polymer, an acrylic copolymer or an acrylic copolymer incorporating non-acrylic monomers.

5. The ballistic resistant fabric of claim 1 wherein said fluorine-containing polymeric binder composition comprises a blend of a fluoropolymer or a fluorocarbon-containing material or both and an acrylic homopolymer, an acrylic copolymer or an acrylic copolymer incorporating non-acrylic monomers.

6. The ballistic resistant fabric of claim 4 wherein the fluoropolymer or fluorocarbon-containing material comprises at least about 1% by weight to about 50% by weight of said fluorine-containing polymeric binder composition.

7. The ballistic resistant fabric of claim 4 wherein the fluoropolymer or fluorocarbon-containing material comprises at least about 3% by weight to about 35% by weight of said fluorine-containing polymeric binder composition.

8. The ballistic resistant fabric of claim 4 wherein the fluoropolymer or fluorocarbon-containing material comprises at least about 5% by weight to about 20% by weight of said fluorine-containing polymeric binder composition.

9. The ballistic resistant fabric of claim 1 wherein said fluorine-containing polymeric binder composition comprises a blend of a fluoropolymer or a fluorocarbon-containing material or both with at least one surfactant.

10. The ballistic resistant fabric of claim 9 wherein the surfactant comprises at least about 0.1% by weight to about 2.5% by weight of said blend.

11. The ballistic resistant fabric of claim 1 wherein said fluorine-containing polymeric binder composition comprises a blend of a fluoropolymer or a fluorocarbon-containing material or both, and an acrylic polymer or copolymer and at least one surfactant.

12. The ballistic resistant fabric of claim 1 wherein said fluorine-containing polymeric binder composition includes a chlorotrifluoroethylene homopolymer, a chlorotrifluoroethylene copolymer, an ethylene-chlorotrifluoroethylene copolymer, an ethylene-tetrafluoroethylene copolymer, a fluorinated ethylene-propylene copolymer, perfluoroalkoxyethylene, polychlorotrifluoroethylene, polytetrafluoroethylene, polyvinyl fluoride, polyvinylidene fluoride, fluorocarbon-modified polyethers, fluorocarbon-modified polyesters, fluorocarbon-modified polyanions, fluorocarbon-modified polyacrylic acid, fluorocarbon-modified polyacrylates, fluorocarbon-modified polyurethanes, or copolymers or blends thereof.

13. The ballistic resistant fabric of claim 1 wherein said fluorine-containing polymeric binder composition includes a fluorotelomer that has been grafted onto a polyether, polyester, polyanion, polyacrylic acid, polyacrylate or polyurethane.

14. The ballistic resistant fabric of claim 1 wherein said fluorine-containing polymeric binder composition comprises from about 10% to about 22% by weight of said fabric.

15. The ballistic resistant fabric of claim 1 wherein said fibers comprise a material selected from the group consisting of polyolefin fibers, aramid fibers, polybenzazole fibers, polyvinyl alcohol fibers, polyamide fibers, polyethylene terephthalate fibers, polyethylene naphthalate fibers, polyacrylonitrile fibers, liquid crystal copolyester fibers, glass fibers, carbon fibers, rigid rod fibers comprising pyridobisimidazole-2,6-diyl (2,5-dihydroxy-p-phenylene) and combinations thereof.

16. A soft armor ballistic resistant article formed from the ballistic resistant fabric of claim 1.

17. A ballistic resistant fabric comprising a plurality of non-woven, overlapping, cross-plied fiber plies, said fibers having a tenacity of about 7 g/denier or more and a tensile modulus of about 150 g/denier or more; said fibers having a fluorine-containing polymeric binder composition on a surface thereof; the plurality of overlapping cross-plied fiber plies being consolidated with said fluorine-containing polymeric binder composition to form said single-layer, consolidated fabric.

18. The ballistic resistant fabric of claim 17 wherein said fluorine-containing polymeric binder composition comprises a blend of a fluoropolymer or a fluorocarbon-containing material or both and at least one additional polymer comprising a polyurethane polymer, a polyether polymer, a polyester polymer, a polycarbonate resin, a polyacetal polymer, a polyamide polymer, a polybutylene polymer, an ethylene-vinyl acetate copolymer, an ethylene-vinyl alcohol copolymer, an ionomer, a styrene-isoprene copolymer, a styrene-butadiene copolymer, a styrene-ethylene/butylene copolymer, a styrene-ethylene/propylene copolymer, a polymethyl pentene polymer, a hydrogenated styrene-ethylene/butylene copolymer, a maleic anhydride functionalized styrene-ethylene/butylene copolymer, a carboxylic acid functionalized styrene-ethylene/butylene copolymer, an acrylonitrile polymer, an acrylonitrile butadiene styrene copolymer, a polypropylene polymer, a polypropylene copolymer, an epoxy resin, a novolac resin, a phenolic resin, a vinyl ester resin, a silicone resin, a nitrile rubber polymer, a natural rubber polymer, a cellulose acetate butyrate polymer, a polyvinyl butyral polymer, an acrylic polymer, an acrylic copolymer or an acrylic copolymer incorporating non-acrylic monomers.

19. The ballistic resistant fabric of claim 17 wherein said fluorine-containing polymeric binder composition comprises a blend of a fluoropolymer or a fluorocarbon-containing material or both and an acrylic homopolymer, an acrylic copolymer or an acrylic copolymer incorporating non-acrylic monomers.

20. The ballistic resistant fabric of claim 18 wherein the fluoropolymer or fluorocarbon-containing material comprises at least about 1% by weight to about 50% by weight of said fluorine-containing polymeric binder composition.

21. The ballistic resistant fabric of claim 18 wherein the fluoropolymer or fluorocarbon-containing material comprises at least about 3% by weight to about 35% by weight of said fluorine-containing polymeric binder composition.

22. The ballistic resistant fabric of claim 18 wherein the fluoropolymer or fluorocarbon-containing material comprises at least about 5% by weight to about 20% by weight of said fluorine-containing polymeric binder composition.

23. The ballistic resistant fabric of claim 17 wherein said fluorine-containing polymeric binder composition comprises a blend of a fluoropolymer or a fluorocarbon-containing material or both with at least one surfactant.

24. The ballistic resistant fabric of claim 23 wherein the surfactant comprises at least about 0.1% by weight to about 2.5% by weight of said blend.

25. The ballistic resistant fabric of claim 17 wherein said fluorine-containing polymeric binder composition comprises a blend of a fluoropolymer or a fluorocarbon-containing material or both, and an acrylic polymer or copolymer and at least one surfactant.

26. The ballistic resistant fabric of claim 17 wherein said fluorine-containing polymeric binder composition comprises from about 10% to about 22% by weight of said fabric.

27. The ballistic resistant fabric of claim 17 wherein said fluorine-containing polymeric binder composition includes a chlorotrifluoroethylene homopolymer, a chlorotrifluoroethylene copolymer, an ethylene-chlorotrifluoroethylene copolymer, an ethylene-tetrafluoroethylene copolymer, a fluorinated ethylene-propylene copolymer, perfluoroalkoxyethylene, polychlorotrifluoroethylene, polytetrafluoroethylene, polyvinyl fluoride, polyvinylidene fluoride, fluorocarbon-modified polyethers, fluorocarbon-modified polyesters, fluorocarbon-modified polyanions, fluorocarbon-modified polyacrylic acid, fluorocarbon-modified polyacrylates, fluorocarbon-modified polyurethanes, or copolymers or blends thereof.

28. The ballistic resistant fabric of claim 17 wherein each fiber ply comprises a plurality of unidirectional fibers arranged in a substantially parallel array.

29. The ballistic resistant fabric of claim 17 wherein each of said fiber plies are cross-plied orthogonally relative to the fiber direction of each adjacent fiber ply.

30. A soft armor ballistic resistant article formed from the ballistic resistant fabric of claim 17.

31. A method of producing a ballistic resistant fabric, the method comprising either step I) or step II), wherein:
I) applying a fluorine-containing polymeric binder composition onto a surface of a plurality of fibers and thereafter forming at least one fiber ply from said fibers; said fibers having a tenacity of about 7 g/denier or more and a tensile modulus of about 150 g/denier or more; or
II) forming at least one fiber ply and thereafter applying a fluorine-containing polymeric binder composition onto a surface of said at least one fiber ply; said fibers having a tenacity of about 7 g/denier or more and a tensile modulus of about 150 g/denier or more.

32. The method of claim 31 wherein step I) is conducted.

33. The method of claim 31 wherein step II) is conducted.

* * * * *